United States Patent [19]

Izzi

[11] 4,185,334
[45] Jan. 29, 1980

[54] WALL URINAL MOUNTING FLANGE

[76] Inventor: Lewis B. Izzi, 918 Surrey Dr., Shelby, N.C. 28150

[21] Appl. No.: 962,759

[22] Filed: Nov. 21, 1978

[51] Int. Cl.² .............................................. E03C 1/00
[52] U.S. Cl. ....................................... 4/191; 4/252 R; 285/58; 403/337
[58] Field of Search ............... 4/252 R, 191, 301, 170; 285/58, 56, 177, 412, 414; 403/337

[56] References Cited

U.S. PATENT DOCUMENTS

| 1,042,465 | 10/1912 | Oakes | 285/58 |
| 1,676,276 | 7/1928 | Moore | 285/56 |
| 3,015,501 | 1/1962 | Minella | 4/252 R |
| 3,905,052 | 9/1975 | De Angelis | 4/252 R |
| 3,967,326 | 7/1976 | Tammen | 285/58 |

Primary Examiner—Lenard A. Footland
Attorney, Agent, or Firm—Raymond N. Matson

[57] ABSTRACT

A urinal mounting flange of plastic or any suitable material having urinal supporting bolts which may be leveled in arcuate slots having a predetermined spacing after the welding material in the connection with a drain pipe has set.

1 Claim, 3 Drawing Figures

WALL URINAL MOUNTING FLANGE

This invention relates generally to plumbing fixtures and more particularly to an improved flange for mounting a urinal or similar fixture on a wall in a level position while affording a sealed connection with a drain pipe and the fixture.

Mounting flanges of this general type are known in the art but, as a whole, are objectionable in that they must be fitted to fixture mounting holes and they may not be leveled to properly support a fixture after the welding materials fixing it to a drain pipe is set. This is a serious disadvantage inasmuch as the solvent or welding material employed set very quickly and do not afford much time for fitting the bolts to fixture mounting holes and proper leveling of the fixture supporting flange.

Accordingly, the main object of the present invention is to provide an improved flange for connecting urinals and similar fixtures having comparable attachment requirements to drain pipes in level position to eliminate the objectionable features of known mounting flanges.

An important object of the present invention is to provide an improved mounting flange for urinals which is provided with arcuate, bolt-receiving slots to enable the leveling of the urinal supporting bolts after the drain pipe solvent or welding material has set.

Another important object of the present invention is to provide an improved mounting flange which is provided with two sets of bolt-receiving arcuate slots which are centered about the center of the flange body so as to enable them to fit the two standard spacings of the mounting holes of urinals, etc.

A further important object of the present invention is to provide an improved wall mounting flange for urinals, etc. which provides a seal between the urinal outlet and the drain pipe and which facilitates the installation thereof and which is susceptible of ready and economical manufacture.

Other objects and advantages of the invention will become apparent during the course of the following description.

In the drawings, one embodiment of the invention is shown. In this showing:

Figure 1:
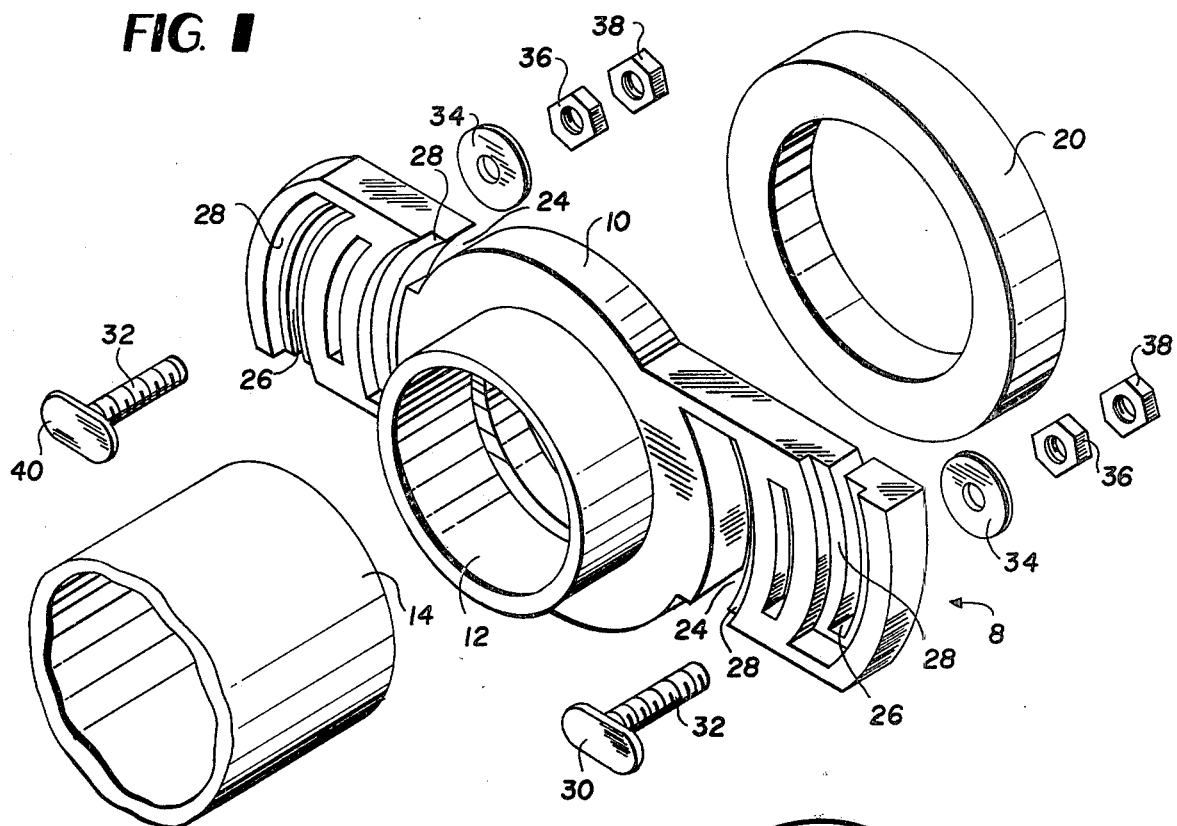
FIG. 1 is a perspecitve exploded view of the mounting flange comprising the present invention showing its relationship to a drain pipe projecting through an opening in a finished wall.
Figure 2:
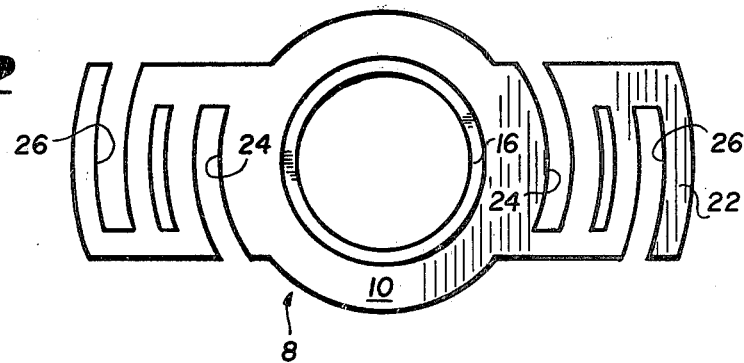
FIG. 2 is an outer end view of the flange.

Referring to the drawings, numeral 8 designates the flange as a whole which has an annular body 10 in substantially horizontal position and for convenience of reference, the end toward the urinal or other fixture is referred to as outer and the end toward the wall W as inner. The flange 8 as shown is formed of a suitable injection molded plastic but may be constructed of any material to apply to any drain pipe such as cast iron, brass, steel, etc.

The annular flange body 10 is provided on its inner end with a shoulder 11 and a tubular socket 12 for the inner or outer reception of the end of either of two sizes of drain pipe 14, and on its outer end with a tubular rim 16 which, with the outer end face of the body 10 forms a seat 18 for an annular seal or gasket 20.

A pair of diametrically opposite brackets 22 extend outwardly from the flange body 10 and each is provided with a pair of open ended arcuate slots 24 and 26 respectively which are concentric with the flange body 10 at four and six inch centers. This enables the flange 8 to be used with either of the two spacings of mounting holes 25 used by the current standard fixtures and the two spacings, of course, may be varied as the spacing of the mounting holes of fixtures change.

It is to be noted that the faces of the brackets 22 adjacent each side of the slots 24 and 26 are recessed as at 28 so that the heads 30 of the urinal supporting bolts 32 are within the bracket faces when the bolts are inserted. Each bolt 32 is provided with a washer 34 and two nuts 36 and 38 respectively for leveling and urinal mounting purposes as will now be described.

Figure 3:
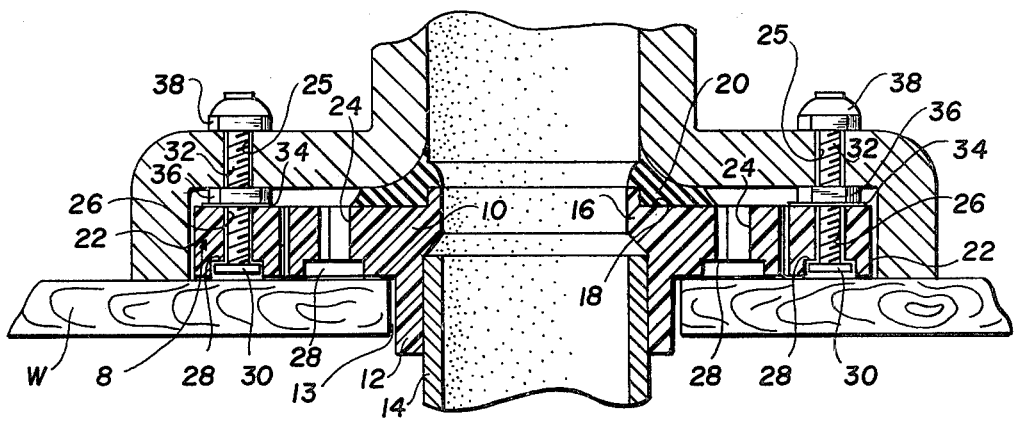
FIG. 3 is a central horizontal sectional view of the flange while solvent welded to a drain pipe and supporting a urinal or similar fixture in a leveled position.

The flange 8 greatly facilitates the level wall mounting of a urinal, etc. (FIGS. 1 and 3) as will become apparent. Conventionally, the drain pipe 14 is cut off and projects through an opening 13 in the wall W and about one quarter of an inch beyond with a clearance of about one quarter of an inch about its periphery. The two bolts 32 are now inserted in either the slots 24 or 26 depending on the spacing of the mounting holes in the urinal, and project outwardly.

The plactic flange socket 12 which closely fits the end of the drain pipe 14 is now coated with solvent welding material and placed over the pipe end so that the mounting brackets 22 extend laterally in a substantially horizontal position. When the solvent welding material has set, the two bolts are moved in their slots to an exact horizontal position, checked with a level, and receive the washers 34 and the nuts 36 so as to be rigidly fixed in position. This ability to make final adjustments in leveling after the welding material is set is an important feature of the invention. Thereafter, the seal 20 is positioned on its seat 18 and the urinal, etc. is mounted on the bolts by their mounting holes 25 and the nuts 38 secured to the ends of the bolts 32 to secure and seal the connection.

It is to be understood that the form of the invention herewith shown and described is to be taken as a preferred example of the same and that various changes in the shape, size and arrangement of parts may be resorted to without departure from the spirit of the invention or the scope of the subjoined claims.

What is claimed is:

1. A device for mounting a urinal or similar fixture having spaced mounting holes on the end of a drain pipe projecting through an opening in a wall comprising a cylindrical body having a pipe-receiving socket to be welded to said pipe; said device having a pair of laterally and diametrically oppositely extending flanges and an arcuate slot formed in each concentrically with said body; said slots having the same spacing as said urinal mounting holes and being adapted to receive urinal supporting bolts movable in said slots so as to be sucured therein in a horizontal plane to receive and support said urinal in a leveled position; and a tubular rim formed on the outer face of said body for receiving an annular seal to be compressed between said urinal and said flange body by said bolts; and a second arcuate slot formed in each of said laterally extending flanges concentric with said body at predetermined spacings from said first mentioned slots so as to fit spaced urinal mounting holes having a different predetermined spacing, each of said flanges having the slots opening in different directions, slots at the same radius opening in the same rotational direction.

* * * * *